(12) United States Patent
Kirita et al.

(10) Patent No.: US 11,325,465 B2
(45) Date of Patent: May 10, 2022

(54) WORK VEHICLE

(71) Applicant: Hitachi Construction Machinery Co., Ltd., Tokyo (JP)

(72) Inventors: Katsuyuki Kirita, Higashine (JP); Masamichi Tanaka, Higashine (JP); Yuuto Abe, Higashine (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 139 days.

(21) Appl. No.: 16/644,851

(22) PCT Filed: Feb. 15, 2019

(86) PCT No.: PCT/JP2019/005596
§ 371 (c)(1),
(2) Date: Mar. 5, 2020

(87) PCT Pub. No.: WO2019/181306
PCT Pub. Date: Sep. 26, 2019

(65) Prior Publication Data
US 2021/0070168 A1 Mar. 11, 2021

(30) Foreign Application Priority Data
Mar. 23, 2018 (JP) .............................. JP2018-056736

(51) Int. Cl.
*B60K 15/077* (2006.01)
*E01C 19/26* (2006.01)
(Continued)

(52) U.S. Cl.
CPC ............ *B60K 15/077* (2013.01); *E01C 19/26* (2013.01); *B60K 2015/03118* (2013.01);
(Continued)

(58) Field of Classification Search
CPC .......... B60K 15/077; B60K 2015/3118; B60K 2015/03144; B60K 2015/03243;
(Continued)

(56) References Cited

U.S. PATENT DOCUMENTS 2,530,819 A 11/1950 Hamlin
3,311,183 A 3/1967 Phillips
(Continued)

FOREIGN PATENT DOCUMENTS

EP 2 826 656 A1 1/2015
GB 842590 A 7/1960
(Continued)

OTHER PUBLICATIONS

International Search Report (PCT/ISA/210) issued in PCT Application No. PCT/JP2019/005597 dated Mar. 26, 2019 with English translation (four (4) pages).
(Continued)

*Primary Examiner* — Mahmoud Gimie
(74) *Attorney, Agent, or Firm* — Crowell & Moring LLP

(57) ABSTRACT

A work vehicle including a tank (31,131) formed so as to extend from a rear part of a vehicle body toward a center, wherein the tank includes: a first storage tank (32) located on the rear side of the vehicle body, and stores stored fluid (9); a second storage tank (34) located on a side close to the center in the front-rear direction of the vehicle body, and stores the fluid; a partition part (36) that separates the first storage tank and the second storage tank; a discharge member (49) that has a discharge opening (49a) extending and opened inside the second storage tank, and discharges, from the second storage tank, the fluid stored in the second storage tank; and a hollow tube member (60) that has a first end communicated with the first storage tank through the partition part so as to enable the stored fluid to flow, and a
(Continued)

second end having a hollow tube opening (62) extending and opened toward the center of the vehicle body inside the second storage tank, wherein the hollow tube opening of the hollow tube member is located on the central side of the vehicle body with respect to the discharge opening of the discharge member.

9 Claims, 8 Drawing Sheets

(51) Int. Cl.
    *B60K 15/03*      (2006.01)
    *E01C 19/28*      (2006.01)
    *F02M 37/00*      (2006.01)

(52) U.S. Cl.
    CPC .............. *B60K 2015/03144* (2013.01); *B60K 2015/03243* (2013.01); *E01C 19/28* (2013.01); *F02M 37/00* (2013.01); *F02M 37/0076* (2013.01); *F02M 37/0088* (2013.01); *F02M 2700/00* (2013.01)

(58) Field of Classification Search
    CPC ......... E01C 19/26; E01C 19/28; F02M 37/00; F02M 37/0076; F02M 37/0088; F02M 2700/00
    USPC .......................................................... 123/256
    See application file for complete search history.

(56) References Cited

U.S. PATENT DOCUMENTS

| | | | |
|---|---|---|---|
| 3,586,363 A | 6/1971 | Omlid | |
| 4,288,086 A | 9/1981 | Oban et al. | |
| 4,664,144 A | 5/1987 | Lemmon | |
| 4,852,892 A | 8/1989 | Reid | |
| 5,658,013 A | 8/1997 | Bees et al. | |
| 5,983,932 A | 11/1999 | Wagner et al. | |
| 6,550,811 B1 | 4/2003 | Bennett et al. | |
| 2002/0148510 A1* | 10/2002 | Viebahn | F04F 5/54 137/574 |
| 2005/0087236 A1 | 4/2005 | Woo | |
| 2006/0033322 A1 | 2/2006 | Suess | |
| 2007/0163660 A1 | 7/2007 | Mowatt et al. | |
| 2008/0000916 A1 | 1/2008 | Hwang | |
| 2009/0178653 A1* | 7/2009 | Suda | F02M 37/0094 123/509 |
| 2012/0139225 A1 | 6/2012 | Sonderegger et al. | |
| 2013/0305717 A1 | 11/2013 | Roehr et al. | |
| 2015/0114363 A1 | 4/2015 | Voss et al. | |
| 2015/0191896 A1 | 7/2015 | Voss et al. | |
| 2015/0217634 A1* | 8/2015 | Sawai | F01N 3/021 280/834 |
| 2015/0260626 A1 | 9/2015 | Frelich et al. | |
| 2015/0345352 A1* | 12/2015 | Mitobe | F01N 3/20 60/282 |
| 2016/0089974 A1 | 3/2016 | Tanigawa et al. | |
| 2016/0176278 A1 | 6/2016 | Bletscher et al. | |
| 2017/0036536 A1 | 2/2017 | Green | |
| 2017/0113543 A1 | 4/2017 | Pelarski et al. | |
| 2017/0144536 A1 | 5/2017 | Kim et al. | |
| 2018/0038075 A1 | 2/2018 | Yamada et al. | |
| 2018/0044886 A1 | 2/2018 | Namai | |
| 2021/0252970 A1 | 8/2021 | Kirita et al. | |

FOREIGN PATENT DOCUMENTS

| | | | |
|---|---|---|---|
| JP | 61-287822 A | 12/1986 | |
| JP | 7-76231 A | 3/1995 | |
| JP | 10-35299 A | 2/1998 | |
| JP | 10-67214 A | 3/1998 | |
| JP | 11-245677 A | 9/1999 | |
| JP | 2000-142127 A | 5/2000 | |
| JP | 2000-192507 A | 7/2000 | |
| JP | 2001-12326 A | 1/2001 | |
| JP | 2002-59750 A | 2/2002 | |
| JP | 2006-27316 A | 2/2006 | |
| JP | 2006-169853 A | 6/2006 | |
| JP | 2006-341719 A | 12/2006 | |
| JP | 2008-25207 A | 2/2008 | |
| JP | 2014-145201 A | 8/2014 | |
| JP | 2017-136875 A | 8/2017 | |
| JP | 2018-19625 A | 2/2018 | |
| KR | 2002-0084549 A | 11/2002 | |

OTHER PUBLICATIONS

Japanese-language Written Opinion (PCT/ISA/237) issued in PCT Application No. PCT/JP2019/005597 dated Mar. 26, 2019 (three (3) pages).

International Search Report (PCT/ISA/210) issued in PCT Application No. PCT/JP2019/005596 dated Mar. 26, 2019 with English translation (four (4) pages).

Japanese-language Written Opinion (PCT/ISA/237) issued in PCT Application No. PCT/JP2019/005596 dated Mar. 26, 2019 (three (3) pages).

United States Notice of Allowance issued in U.S. Appl. No. 16/644,855 dated Feb. 9, 2022 (14 pages).

* cited by examiner

WORK VEHICLE

TECHNICAL FIELD

The present invention relates to a work vehicle, and particularly to a technology for improving supply performance of fuel to an internal combustion engine mounted on a work vehicle.

BACKGROUND ART

Generally, in road pavement work, an earthwork vibration roller is used in order to equalize flatness of the ground before construction of asphalt.

This earthwork vibration roller is mounted with an engine and a fuel tank on a rear part thereof. When the earthwork vibration roller climbs, a vehicle body inclines in the front-rear direction, and therefore when fuel stored in the fuel tank is less, the fuel is biased to the rear side in the front-rear direction of the inside of the fuel tank.

Thus, when the fuel is biased to the rear side in the front-rear direction of the inside of the fuel tank, for example, in a case where an inlet for supplying the fuel from the fuel tank to the engine is located at the center in the front-rear direction of the fuel tank, there is a possibility that a motor which feeds the fuel to the engine cannot suck the fuel.

A technology for retaining a part of the fuel near the inlet at the time of inclination by providing a retaining part inside the fuel tank is developed (Patent Document 1).

PRIOR ART DOCUMENT

Patent Document

Patent Document 1: Japanese Patent Laid-Open No. 2006-341719

SUMMARY OF THE INVENTION

Problems to be Solved by the Invention

However, in the technology disclosed in the aforementioned Patent Document 1, an amount of the fuel retained near the inlet is reduced depending on the inclination angle, and therefore there is room for further improvement.

The present invention has been made in view of such a problem, and an object of the present invention is to provide a work vehicle including a tank capable of supplying fuel to an internal combustion engine regardless of the inclination angle of a work vehicle inclined in the front-rear direction in a case where stored fluid is fuel of an internal combustion engine mounted on the work vehicle.

Means for Solving the Problems

In order to attain the aforementioned object, a work vehicle of the present invention is a work vehicle including a tank formed so as to extend from a front part or a rear part of a vehicle body toward a center in a front-rear direction of the vehicle body, wherein the tank includes: a first storage tank located on a front side or a rear side of the vehicle body, and stores stored fluid; a second storage tank located on a side close to the center in the front-rear direction of the vehicle body, and stores the stored fluid; a partition part that separates the first storage tank and the second storage tank; a discharge member that has a discharge opening extending and opened inside the second storage tank, and discharges, from the second storage tank, the stored fluid stored in the second storage tank; and a hollow tube member that has a first end communicated with the first storage tank through the partition part so as to enable the stored fluid to flow, and a second end having a hollow tube opening extending and opened toward the center in the front-rear direction of the vehicle body inside the second storage tank, wherein the hollow tube opening of the hollow tube member is located on the side close to the center in the front-rear direction of the vehicle body with respect to the discharge opening of the discharge member.

Advantageous Effects of the Invention

According to a work vehicle of the present invention, in a case where stored fluid is fuel for an internal combustion engine mounted on the work vehicle, a tank can supply the fuel to the internal combustion engine regardless of the inclination angle of the work vehicle inclined in the front-rear direction.

MODE FOR CARRYING OUT THE INVENTION

Hereinafter, an embodiment of the present invention will be described with reference to the drawings.

First Embodiment

Figure 1:
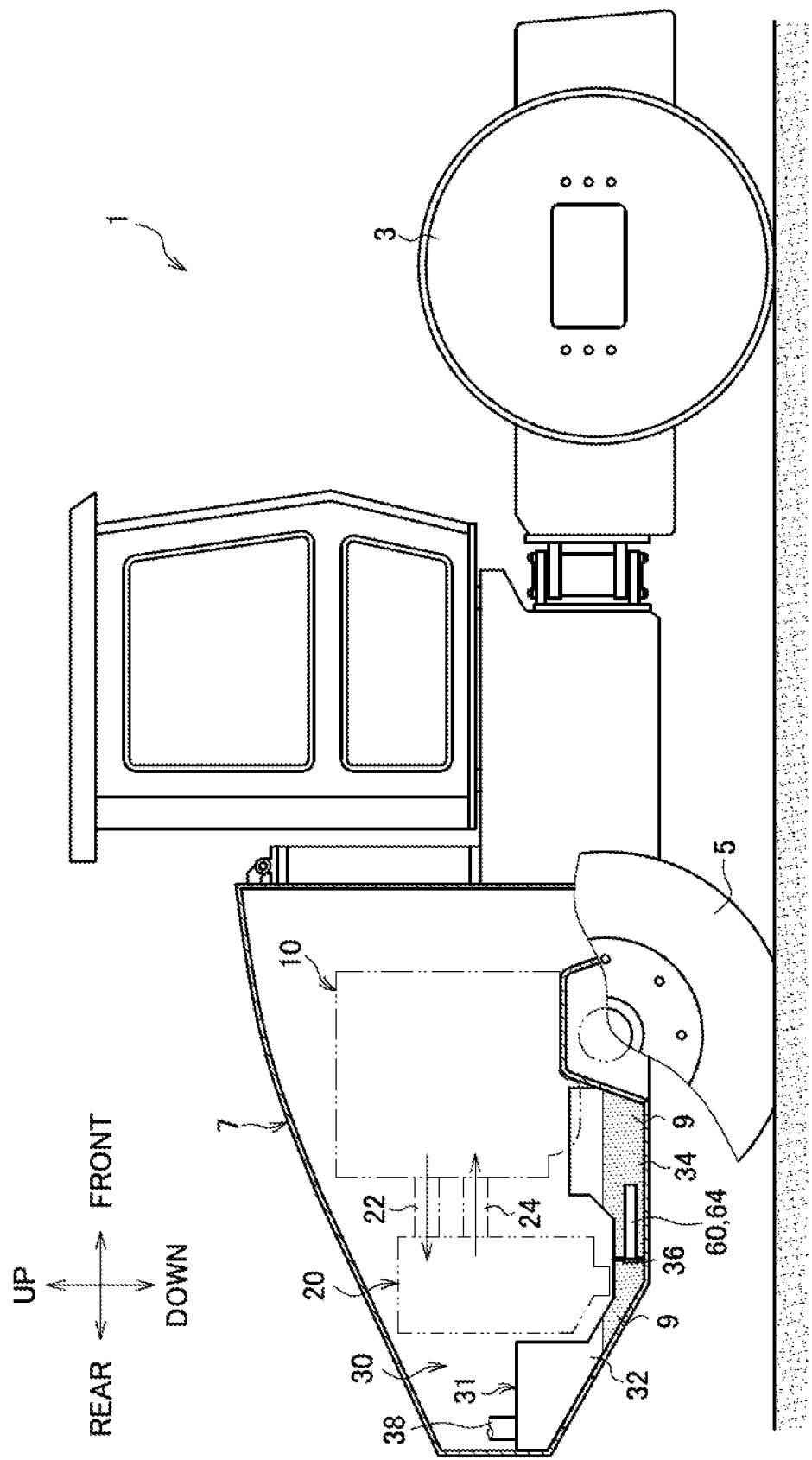
FIG. 1 is a side view of a rolling machine mounted with a fuel tank according to the present invention.

Referring to FIG. 1, a side view of a vehicle body 1 of a rolling machine (work vehicle) mounted with a tank according to the present invention is illustrated. The vehicle body 1 is a so-called earthwork vibration roller having front wheels 3 which are iron wheels, and capable of compacting the ground before construction of asphalt by vibrating the front wheels 3 by an eccentric weight (not illustrated) provided in the front wheels 3 while moving forward and rearward the vehicle body 1 by driving rubber rear wheels 5, for example. This vehicle body 1 is mounted with an engine (internal combustion engine) 10, a cooling device 20 and a fuel tank unit 30.

The engine 10 is an internal combustion engine that burns fuel (stored fluid) 9 supplied from the fuel tank unit 30 to generate driving force, and is mounted on the front side with respect to the center of an engine room 7 provided in a rear part in the front-rear direction of the vehicle body 1. The cooling device 20 is a so-called heat exchanger provided on the rear side in the front-rear direction of the vehicle body 1 with respect to the engine 10. The cooling device 20 is connected to the engine 10 by a high-temperature pipe 22 and a low-temperature pipe 24 so as to enable cooling water to flow. More specifically, cooling water that flows through a water jacket (not illustrated) provided in the engine 10 is heated by heat generated by operation of an engine 10, and high-temperature cooling water flows through the cooling device 20 through the high-temperature pipe 22. This high-temperature cooling water is cooled by the cooling device 20 to flows through the engine 10 through the low-temperature pipe 24. Consequently, in the engine 10, excessive rise of the internal temperature is suppressed.

Figure 2:
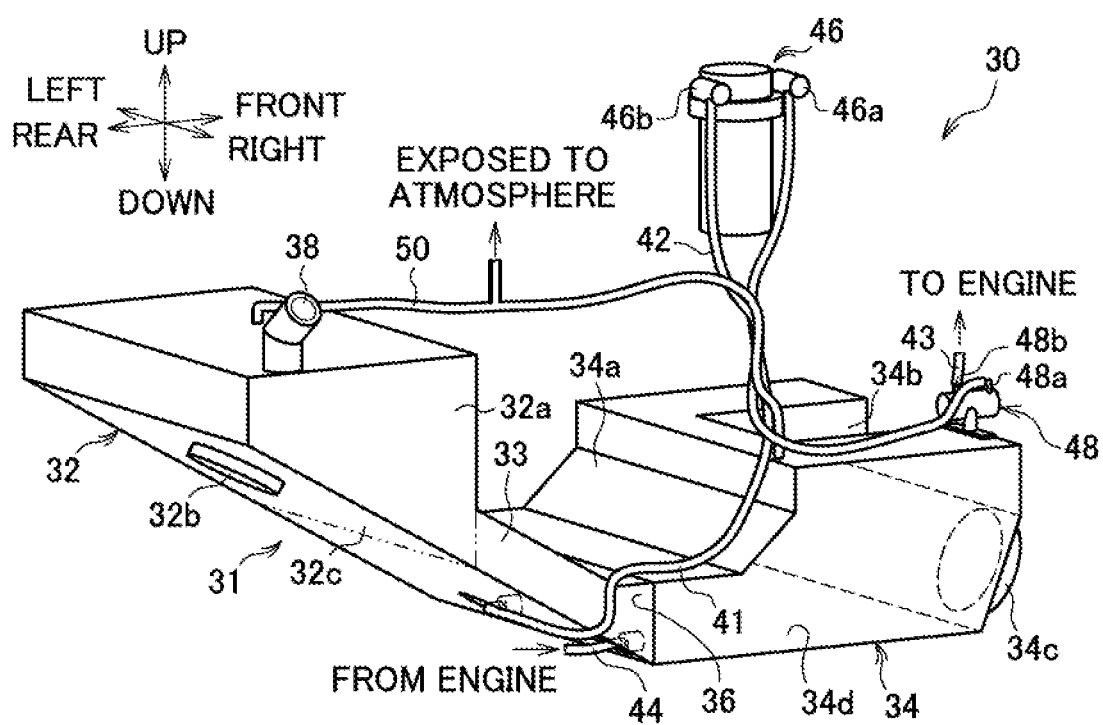
FIG. 2 is a perspective view of a fuel tank unit viewed from the obliquely right rear side of a rolling machine according to a first embodiment.

Referring to FIG. 2, a perspective view of the fuel tank unit 30 viewed from the obliquely right rear side of the vehicle body 1 according to the first embodiment is illustrated.

The fuel tank unit 30 includes a fuel tank (tank) 31, a filter device 46, and a pump 48. The fuel tank 31 is, for example, a resin tank formed so as to extend toward the center as viewed in the front-rear direction of the vehicle body 1 from the rear side of the cooling device 20 that is the rear part of the vehicle body 1 to the lower side of the cooling device 20.

More specifically, the fuel tank 31 includes a first storage tank 32 located at a rear part of the vehicle body 1, and capable of storing the fuel 9, and a second storage tank 34 located on the lower side of the engine 10 which is on the side close to a center with respect to the first storage tank 32 as viewed in the front-rear direction of the vehicle body 1, and capable of storing the fuel 9. Additionally, the fuel tank 31 includes a partition plate (partition part) 36 that separates the first storage tank 32 and the second storage tank 34, and includes a first tubular member (hollow tube member) 60 and a second tubular members (hollow tube members) 64. In this fuel tank 31, one ends of a breather hose 50 are connected to an upper end surface of the first storage tank 32 and an upper end surface of the second storage tank 34. An upper part of the first storage tank 32 or an upper part of the second storage tank 34 sometimes has high pressure by volatilization of the stored fuel 9. Therefore, a canister (not illustrated) is provided in the other end of the breather hose 50, and the fuel 9 volatilized from high-pressure air generated in the upper part of the first storage tank 32 or the upper part of the second storage tank 34 can be extracted to be opened to the atmosphere.

The first storage tank 32 includes a rear storage tank 32a located on the rear side of the cooling device 20, and a center storage tank 33 located on the lower side of the cooling device 20. In the rear storage tank 32a, an oil filling port (replenishing port) 38 for supplying the fuel 9 to the first storage tank 32 is provided on the right in the right-left direction of the upper part. The lower surface 32c of the rear storage tank 32a is formed in a shape inclined at a predetermined angle so as to lower forward from a rear end to a front end as viewed from the right-left direction of the vehicle body 1. A first cleaning window 32b is provided in the lower surface 32c of this rear storage tank 32a. The first cleaning window 32b is a window for cleaning the first storage tank 32 when an operator wrongly supplies liquid medicine other than the fuel 9 such as a reducing agent from the oil filling port 38 to the first storage tank 32, for example.

The center storage tank 33 extends toward the second storage tank 34 from the rear storage tank 32a. This center storage tank 33 is formed in a shape in which an upper surface and a lower surface are each inclined at a predetermined angle from the rear end to the front end as viewed from a side surface of the vehicle body 1.

In the second storage tank 34, a recess 34a for avoiding interference with the cooling device 20 is formed in a rear upper part, and a groove 34b for avoiding interference with the engine 10 is formed at a center in the right-left direction in a front upper part. Additionally, a second cleaning window 34c is provided in a front end of the second storage tank 34. This second cleaning window 34c is a window for cleaning the second storage tank 34 similarly to the first cleaning window 32b.

A first tube 41 and a fourth tube (return part) 44 are connected to the second storage tank 34. The fourth tube 44 has a first end connected to the partition plate 36 so as to be able to supply the fuel 9 to the second storage tank 34, and a second end connected to the engine 10. The first tube 41 has a first end connected to a sucking-out member 49, described below, connected to the partition plate 36 so as to enable the fuel 9 to flow through the second storage tank 34, and has a second end connected to the filter device 46 so as to enable the fuel 9 to flow. The filter device 46 is a filter for removing fine dust included in the fuel 9, and the second end of the first tube 41 is connected to an introduction part 46a so as to enable the fuel 9 to flow, and a first end of the second tube 42 is connected to a discharge part 46b so as to enable the fuel 9 to flow.

The second tube 42 has the first end connected to the discharge part 46b of the filter device 46 so as to enable the fuel 9 to flow, and a second end connected to an introduction part 48a of the pump 48 so as to enable the fuel 9 to flow. The pump 48 is, for example, a trochoid type pump, sucks the fuel 9 from the second tube 42 through the introduction part 48a, and discharges the fuel 9 to a third tube 43 connected to a first end of the pump so as to enable the fuel 9 to flow from a discharge part 48b. The third tube 43 has a first end connected to the discharge part 48b of the pump 48 so as to enable the fuel 9 to flow, and a second end connected to the engine 10 so as to enable the fuel 9 to flow. Thus, the fuel 9 stored in the second storage tank 34 is introduced in the filter device 46 through the first tube 41 to be purified, and thereafter is sucked in the pump 48 through the second tube 42, and is supplied to the engine 10 through the third tube 43.

The engine 10 operates by burning the fuel 9 supplied as described above. At this time, fuel 9 that is not used for combustion and remains, out of the fuel 9 supplied to the engine 10, returns to the second storage tank 34 through the fourth tube 44.

Figure 3:
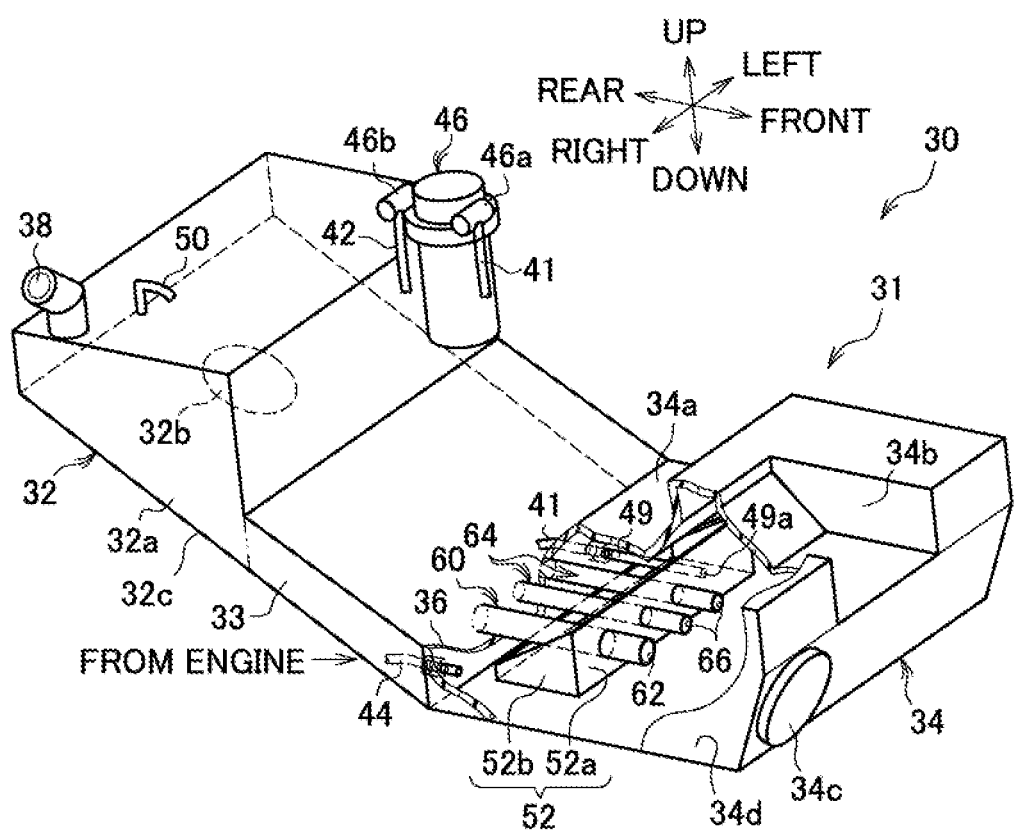
FIG. 3 is a perspective view of the fuel tank unit viewed from the obliquely right front side of the rolling machine according to the first embodiment.

Referring to FIG. 3, a perspective view of the fuel tank unit 30 viewed from the obliquely right front side of the vehicle body 1 according to the first embodiment is illustrated. The first tube 41 is connected so as to be able to supply the fuel 9 to the sucking-out member (discharge member) 49 provided to penetrate the partition plate 36 of the second storage tank 34. This sucking-out member 49 is a hollow tubular member extending to the center in the front-rear direction of the vehicle body 1 from the partition plate 36, in other words, forward, and is provided with an opening (discharge opening) 49a at an end on the front side.

A fuel retaining member (stored fluid retaining part) is provided near the partition plate 36 of the second storage tank 34. This fuel retaining member 52 includes a front wall (wall part) 52a and side walls (wall parts) 52b. The front wall 52a is formed to extend upward from a bottom 34d of the second storage tank 34 such that an upper end is located above an opening 49a of the sucking-out member 49. The side walls 52b are formed so as to extend upward from the bottom 34d of the second storage tank 34 similarly to the front wall 52a, have upper ends formed to be inclined to the bottom 34d side from an upper end of the front wall 52a toward the rear side in the front-rear direction of the vehicle body 1, and two side walls 52b are disposed at right and left ends of the front wall 52a. That is, the front wall 52a and the side walls 52b are disposed so as to surround the front side and the sides in the right-left direction of the opening 49a of the sucking-out member 49.

The first tubular member 60 is a hollow tubular member having a first end opened on the partition plate 36 so as to enable the fuel 9 to flow from the first storage tank 32, and a second end extending toward the center in the front-rear direction of the vehicle body 1 to penetrate the front wall 52a of the fuel retaining member 52. An opening (hollow tube opening) 62 opened so as to enable the fuel 9 to flow through the second storage tank 34 is provided in the second end of this first tubular member 60. This opening 62 is provided on the side close to the center in the front-rear direction of the vehicle body 1 with respect to the opening 49a of the sucking-out member 49.

Similarly to the first tubular member 60, each of the second tubular members 64 is a hollow tubular member having a first end provided on the partition plate 36 so as to enable the fuel 9 to flow from the first storage tank 32, and a second end extending toward the front side of the vehicle body 1 to penetrate the front wall 52a of the fuel retaining member 52, and having a smaller diameter than the first tubular member 60. An opening (hollow tube opening) 66 opened so as to enable the fuel 9 to flow through the second storage tank 34 is provided on the second end of this second tubular member 64. This opening 66 is provided on the front side with respect to the opening 49a of the sucking-out member 49. The two second tubular members 64 are disposed side by side on the left of the vehicle body 1 that is the direction separated from the oil filling port 38 compared to the first tubular member 60.

In other words, the first tubular member 60 has the larger inner diameter than the second tubular members 64, and therefore a circulation possible amount of the fuel 9 per predetermined time can be increased compared to the second tubular members 64. Additionally, the first tubular member 60 is closer to the oil filling port 38 than the second tubular members 64, and therefore the fuel 9 replenished from the oil filling port 38 can be satisfactorily replenished to the second storage tank 34.

Figure 4:
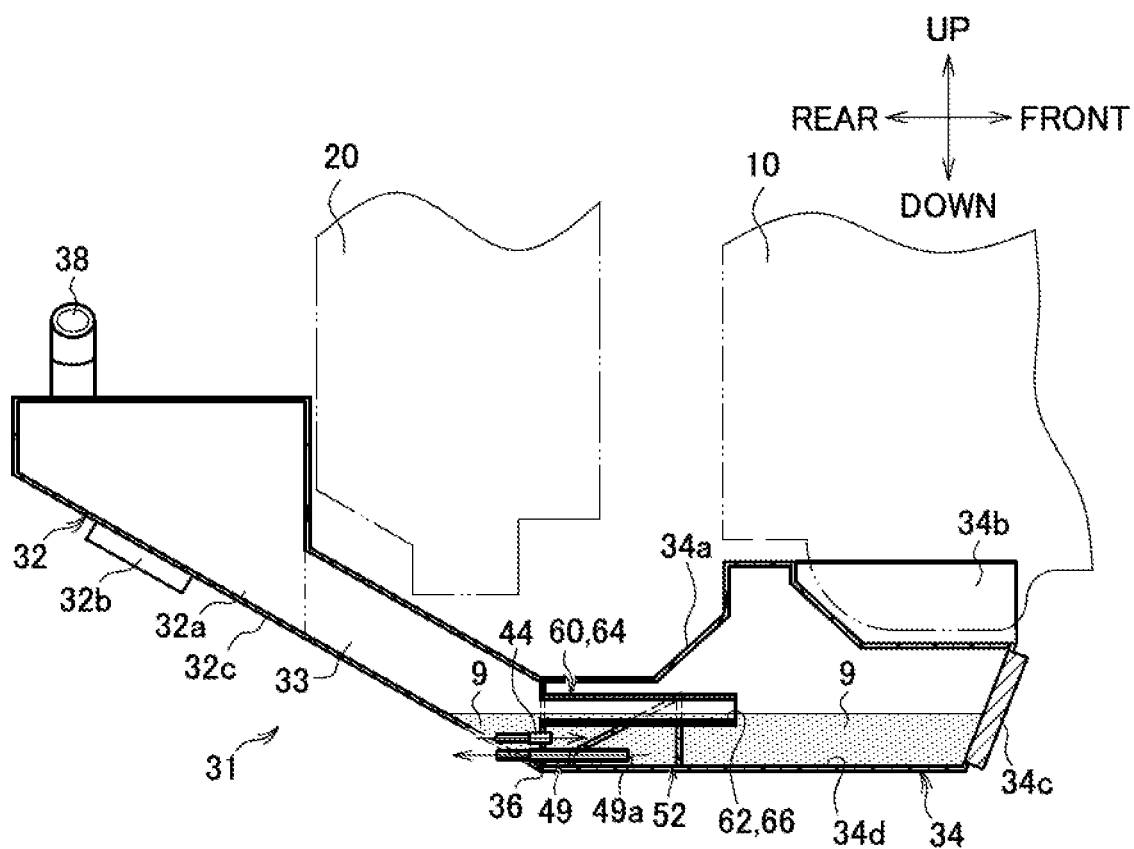
FIG. 4 is an explanatory diagram illustrating a state of fuel when the rolling machine is located on a flat ground.

Referring to FIG. 4, an explanatory diagram illustrating a state of the fuel 9 when the vehicle body 1 is located on a flat ground is illustrated.

When the fuel 9 is supplied from the oil filling port 38 to the first storage tank 32 of the fuel tank 31, the fuel 9 is supplied to the second storage tank 34 through the first tubular member 60 and the second tubular members 64. More specifically, the fuel 9 supplied to the rear storage tank 32a of the first storage tank 32 flows downward along the lower surface 32c by gravity, and passes through the center storage tank 33 to reach the partition plate 36. The first tubular member 60 and the second tubular members 64 are provided in the partition plate 36 so as to enable the fuel 9 to flow through the first tubular member 60 and the second tubular members 64, and therefore the fuel 9 passes through the partition plate 36, the first tubular member 60 and the second tubular members 64 from the center storage tank 33 to be supplied to the second storage tank 34.

Consequently, when the vehicle body 1 is located on the flat ground, the fuel tank 31 can supply the fuel 9 from the sucking-out member 49 to the engine 10 through the filter device 46 and the pump 48.

Figure 5:
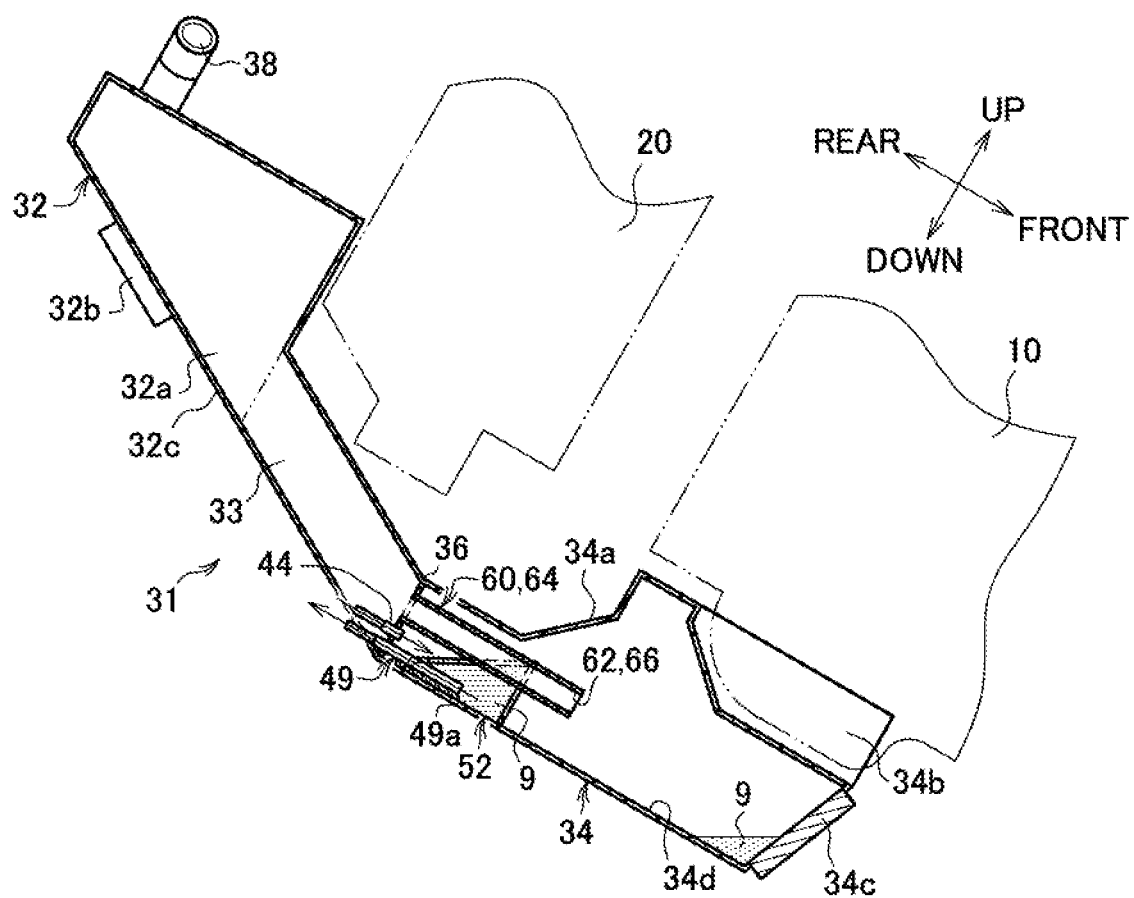
FIG. 5 is an explanatory diagram illustrating a state of fuel when the rolling machine is inclined at a predetermined angle such that a front part of the rolling machine lowers.

Referring to FIG. 5, an explanatory diagram illustrating a state of the fuel 9 when the vehicle body is inclined at a predetermined angle such that a front part of the vehicle body 1 lowers is illustrated.

When the vehicle body 1 is inclined at the predetermined angle such that the front part of the vehicle body 1 lowers, the fuel 9 is biased to be stored on the front side in the front-rear direction of the vehicle body 1 of the second storage tank 34, and in the fuel retaining member 52. More specifically, the fuel 9 stored in the first storage tank 32 and the second storage tank 34 flows from the center storage tank 33 toward the front side in the front-rear direction of the vehicle body 1 of the second storage tank 34 through the first tubular member 60 and the second tubular members 64 by gravity. On the other hand, a part of the fuel 9 stored in the second storage tank 34 is prevented from flowing from the center storage tank 33 toward the front side in the front-rear direction of the vehicle body 1 of the second storage tank 34 by the fuel retaining member 52, and stored in the fuel retaining member 52.

Consequently, when the vehicle body 1 is inclined at the predetermined angle such that the front part of the vehicle body 1 lowers, the fuel 9 is stored in the fuel retaining member 52, so that the fuel tank 31 can supply the fuel 9 from the sucking-out member 49 to the engine 10 through the filter device 46 and the pump 48.

Figure 6:
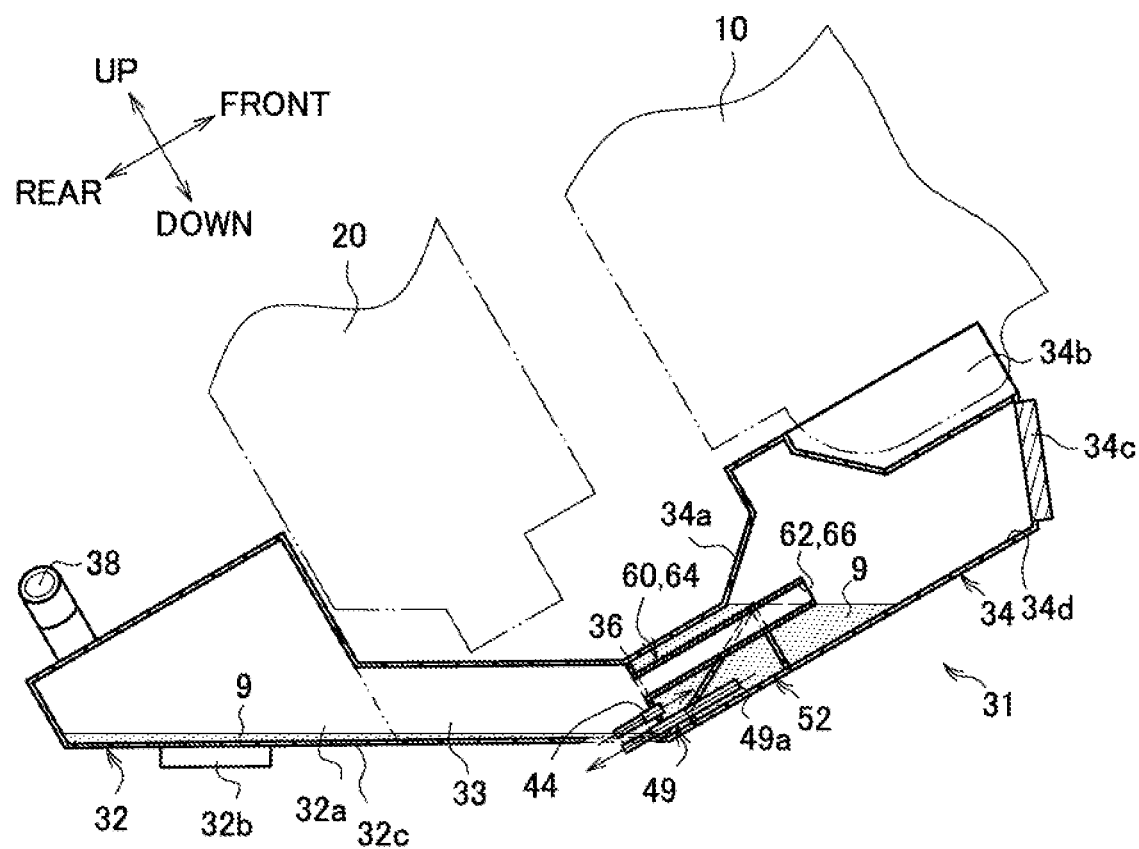
FIG. 6 is an explanatory diagram illustrating a state of fuel when the rolling machine is inclined at a predetermined angle such that the front part of the rolling machine rises.

Referring to FIG. 6, an explanatory diagram illustrating a state of the fuel 9 when the vehicle body 1 is inclined at the predetermined angle such that the front part of the vehicle body 1 rises is illustrated.

When the vehicle body 1 is inclined at the predetermined angle such that the front part of the vehicle body 1 rises, the fuel 9 is biased to be stored near the lower surface 32c of the first storage tank 32, and on the rear side in the front-rear direction of the vehicle body 1 of the second storage tank 34. More specifically, the fuel 9 stored in the second storage tank 34 flows from the center storage tank 33 toward the rear side in the front-rear direction of the vehicle body 1 of the second storage tank 34 through the first tubular member 60 and the second tubular members 64 by gravity. At this time, the first tubular member 60 and the second tubular members 64 extend and open toward the front side of the vehicle body 1 from the partition plate 36, so that the fuel 9 below the opening 62 and the openings 66 of the first tubular member 60 and the second tubular members 64 as viewed in the gravity direction, out of the fuel 9 stored in the second storage tank 34, is biased to be stored on the rear side in the front-rear direction of the vehicle body 1 of the second storage tank 34 without flowing toward the first storage tank 32.

Thus, the first tubular member 60 and the second tubular members 64 extend toward the front side of the vehicle body 1 from the partition plate 36, so that when the vehicle body 1 is inclined at the predetermined angle such that the front part of the vehicle body 1 rises, the fuel tank 31 can store the fuel 9 on the rear side in the front-rear direction of the vehicle body 1 of the second storage tank 34, and therefore it is possible to supply the fuel 9 from the sucking-out member 49 to the engine 10 through the filter device 46 and the pump 48.

The first end of the fourth tube 44 is connected to the second storage tank 34 from the partition plate 36, so that the fuel 9 that is not used for combustion in the engine 10 and remains returns to the second storage tank 34 through the fourth tube 44, and therefore even when the vehicle body 1 is inclined at the predetermined angle such that the front part of the vehicle body 1 rises, it is possible to store the fuel 9 on the rear side in the front-rear direction of the vehicle body 1 of the second storage tank 34.

With such a configuration, even in any of a state in which the vehicle body 1 is located on the flat ground, a state in which the vehicle body 1 is inclined at the predetermined angle such that the front part lowers, and a state in which the vehicle body 1 is inclined at the predetermined angle such that the front part rises, the fuel tank 31 can supply the fuel 9 to the engine 10.

As described above, the work vehicle according to the first embodiment is the work vehicle including the tank formed so as to extend from the rear part of the vehicle body 1 toward the center in the front-rear direction of the vehicle body 1, the fuel tank 31 has the first storage tank 32 that is located on the rear side of the vehicle body 1, and stores the fuel 9, the second storage tank 34 located on the side close to the center in the front-rear direction of the vehicle body 1, and stores stored fluid, the partition plate 36 that separates the first storage tank 32 and the second storage tank 34, and the sucking-out member 49 that has the opening 49a extending and opened inside the second storage tank 34, and discharges the fuel 9 stored in the second storage tank 34 from the second storage tank 34, and the first tubular member and the second tubular members 64 that have first ends communicated with the first storage tank 32 through the partition plate 36 so as to enable the fuel 9 to flow, and have the second ends having the opening 62 and the openings 66 extending and opened toward the center in the front-rear direction of the vehicle body 1 inside the second storage tank 34, and the opening 62 and the openings 66 of the first tubular member 60 and the second tubular members 64 are located on the side close to the center in the front-rear direction of the vehicle body 1 with respect to the opening 49a of the sucking-out member 49.

Therefore, the partition plate 36 that separates the first storage tank 32 and the second storage tank 34 is provided in the fuel tank 31, the first tubular member 60 and the second tubular members 64 having the first ends opened and provided in the partition plate 36, and the second ends having the opening 62 and the openings 66 on the side close to the center in the front-rear direction of the vehicle body 1 with respect to the opening 49a are provided in the second storage tank 34, and therefore, even in a case where the fuel 9 is biased to the rear side of the fuel tank 31, for example, even when the vehicle body 1 climbs a road surface inclined at the predetermined angle, the fuel 9 stored in the second storage tank 34 is stored on the lower side in the gravity direction with respect to the opening 62 provided in the second end of the first tubular member 60, and does not flow through the first storage tank 32, so that the fuel 9 can be discharged from the second storage tank 34 through the opening 49a of the sucking-out member 49 regardless of the inclination angle of the vehicle body 1.

Particularly, the fuel tank 31 is a tank that stores the fuel 9 to be supplied to the engine 10, and therefore even in a case where the fuel 9 is biased to the opposite side to the central side of the fuel tank 31 viewed in the front-rear direction of the vehicle body 1, for example, even when the vehicle body 1 climbs a road surface inclined at the predetermined angle, the fuel 9 is supplied to the engine 10, and the vehicle body 1 can climb.

The fuel retaining member 52 that is provided inside the second storage tank 34 so as to surround the opening 49a by the front wall 52a and the side walls 52b from the center in the front-rear direction of the vehicle body 1 and the left and right sides, and that has the front wall 52a and the side walls 52b extending upward in the vertical direction of the vehicle body 1 with respect to the opening 49a from the bottom of the second storage tank 34 is provided, and therefore even in a case where the fuel 9 is biased to the side close to the center as viewed in the front-rear direction of the vehicle body 1 in the fuel tank 31, for example, even when the vehicle body 1 descends a road surface inclined at the predetermined angle, the fuel 9 is stored in the fuel retaining member 52, and therefore the fuel 9 can be discharged from the second storage tank 34 through the sucking-out member 49.

The first tubular member 60 and the second tubular members 64 extend through the front wall 52a of the fuel retaining member 52, and the opening 62 and the openings 66 are located on the side close to the center in the front-rear direction of the vehicle body 1 with respect to the fuel retaining member 52, and therefore the second ends of the first tubular member 60 and the second tubular members 64 extend toward the center in the front-rear direction of the vehicle body 1 while the fuel retaining member 52 is disposed in the second storage tank 34, and the opening 62 and the openings 66 can be provided on the side close to the center in the front-rear direction of the vehicle body 1.

The oil filling port 38 for supplying the fuel 9 to the first storage tank 32 is provided, and the first tubular member 60 closest to the oil filling port 38, out of the first tubular member 60 and the second tubular members 64, has the largest inner diameter, and therefore when the fuel 9 is supplied from the oil filling port 38 to the fuel tank 31, the fuel 9 can be satisfactorily supplied to the second storage tank 34.

The fourth tube 44 for returning, to the second storage tank 34, a part or all of the fuel 9 discharged from the sucking-out member 49 is provided, and therefore even in a case where the fuel 9 is biased to the rear side of the fuel tank 31, for example, even when the vehicle body 1 climbs a road surface inclined at the predetermined angle, the fuel 9 returned to the second storage tank 34 from the fourth tube 44 can be stored on the lower side in the gravity direction with respect to the opening 62 provided in the second end of the first tubular member 60.

Second Embodiment

Hereinafter, a second embodiment will be described with reference to FIGS. 7 and 8. Description of a configuration common with the configuration of the aforementioned first embodiment will be omitted, and different portions from the first embodiment will be herein described.

Figure 7:
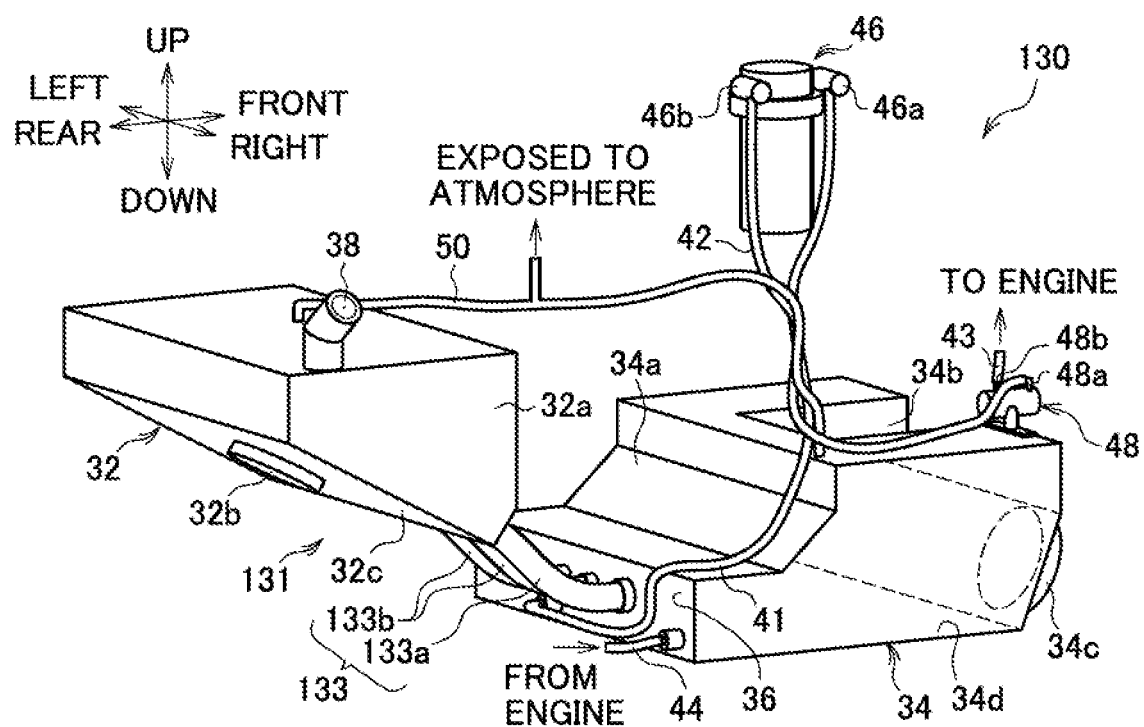
FIG. 7 is a perspective view of a fuel tank unit viewed from the obliquely right rear side of a rolling machine according to a second embodiment.
Figure 8:
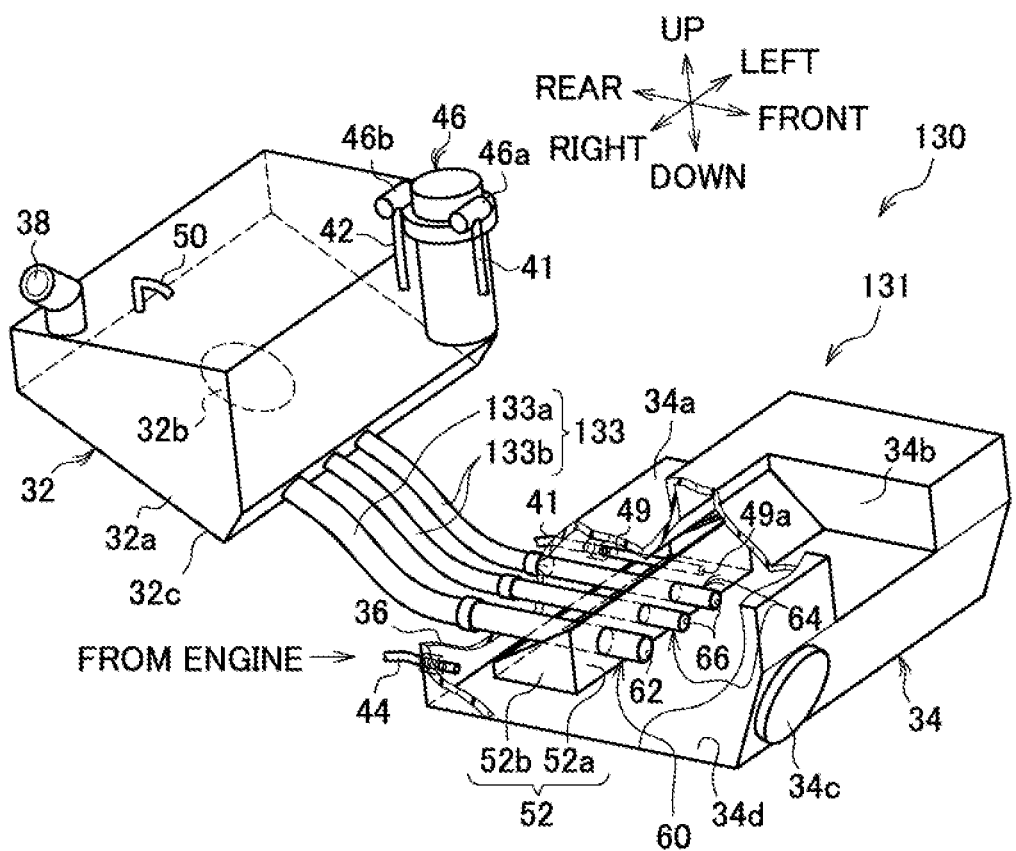
FIG. 8 is a perspective view of the fuel tank unit viewed from the obliquely right front side of the rolling machine according to the second embodiment.

Referring to FIG. 7, a perspective view of a fuel tank unit 130 viewed from the obliquely right rear side of a vehicle body 1 according to the second embodiment is illustrated. Referring to FIG. 8, a perspective view of the fuel tank unit 130 viewed from the obliquely right front side of the vehicle body 1 according to the second embodiment is illustrated.

A fuel tank 131 according to the second embodiment includes a piping part (piping member) 133, in place of the center storage tank 33 according to the first embodiment.

The piping part 133 includes a first pipe 133a and second pipes 133b. The first pipe 133a is a flexible pipe having a first end connected to an end on the rear side of a first tubular member 60 so as to enable the fuel 9 to flow, and a second end connected to a rear storage tank 32a so as to enable the fuel 9 to flow. Each of the second pipes 133b is a flexible pipe having a first end connected to an end on the rear side of a second tubular member 64 so as to enable the fuel 9 to flow, and a second end connected to the rear storage tank 32a so as to enable the fuel 9 to flow, similarly to the first pipe 133a. The two second tubular members 64 are provided in a second storage tank 34, and therefore these two second pipes 133b are connected to the respective second tubular members 64.

That is, the piping part 133 is provided, so that a fuel tank 131 is divided into a first storage tank 32 and the second storage tank 34. The first storage tank 32 and the second storage tank 34 are connected by the piping part 133 so as to enable the fuel 9 to flow. Thus, the fuel tank 131 is divided into the first storage tank 32 and the second storage tank 34, so that an engine 10 or a cooling device 20 can be maintained from a lower side of the an engine 10 or the cooling device 20 disposed above the fuel tank.

As described above, in the work vehicle according to the second embodiment, the fuel tank 131 is divided into the first storage tank 32 and the second storage tank 34, and has the piping part 133 having a first end connected to the first tubular member 60 and the second tubular members 64 so as to enable the fuel 9 to flow, and a second end connected to the first storage tank 32 so as to enable the fuel 9 to flow.

Therefore, the fuel tank 131 is divided into the first storage tank 32 and the second storage tank 34, and the fuel 9 can flow through the first storage tank 32 and the second storage tank 34 through the piping part 133, and therefore for example, maintain of the engine 10 disposed above the fuel tank 131 can be performed from the fuel tank 131 side while the fuel 9 can flow between the first storage tank 32 and the second storage tank 34.

The description of the work vehicle according to the present invention will be finished. The present invention is not limited to the aforementioned embodiments, and can be changed without departing from the spirit of the invention. For example, in this embodiment, the fuel tank 31 for storing the fuel 9, formed so as to extend from the rear part of the vehicle body 1 toward the central part of the vehicle body 1 is described. However, the fuel tank 31 may extend from the front part of the vehicle body 1 toward the central part of the vehicle body 1, or may be a water tank for storing water.

The work vehicle is described as an earthwork vibration roller which is one of rolling machines in the embodiments, but the work vehicle may be a tire roller that compacts asphalt before solidification.

ASPECTS OF PRESENT INVENTION

A work vehicle according to a first aspect of the present invention is a work vehicle including a tank formed so as to extend from a front part or a rear part of a vehicle body toward a center in a front-rear direction of the vehicle body, wherein the tank includes: a first storage tank located on a front side or a rear side of the vehicle body, and stores stored fluid; a second storage tank located on a side close to the center in the front-rear direction of the vehicle body, and stores the stored fluid; a partition part that separates the first storage tank and the second storage tank; a discharge member that has a discharge opening extending and opened inside the second storage tank, and discharges, from the second storage tank, the stored fluid stored in the second storage tank; and a hollow tube member that has a first end communicated with the first storage tank through the partition part so as to enable the stored fluid to flow, and a second end having a hollow tube opening extending and opened toward the center in the front-rear direction of the vehicle body inside the second storage tank, wherein the hollow tube opening of the hollow tube member is located on the side close to the center in the front-rear direction of the vehicle body with respect to the discharge opening of the discharge member.

In the first aspect of the present invention, the partition part that separates the first storage tank and the second storage tank is provided in the tank, the hollow tube member that has the first end opened and provided in the partition part, and the second end having the hollow tube opening on the side close to the center in the front-rear direction of the work vehicle with respect to the discharge opening is provided in the second storage tank, so that even in a case where the stored fluid is biased to the opposite side to the central side as viewed in the front-rear direction of the work vehicle in the tank, for example, even when the work vehicle climbs a road surface inclined at a predetermined angle, the stored fluid stored in the second storage tank is stored on the lower side in the gravity direction with respect to the hollow tube opening provided in the second end of the hollow tube member, and does not flow through the first storage tank, so that the stored fluid can be discharged from the second storage tank through the discharge opening of the discharge member regardless of the inclination angle of the work vehicle.

Thus, in the first aspect, in a case where the stored fluid in the tank is fuel for an internal combustion engine mounted on the work vehicle, the fuel can be supplied to the internal combustion engine regardless of the inclination angle of the work vehicle inclined in the front-rear direction.

In a work vehicle according to a second aspect of the present invention, a stored fluid retaining part that is provided in the second storage tank so as to surround the discharge opening by a wall part from the center in the front-rear direction of the vehicle body, and right and left sides, and that has the wall part extending upward in a vertical direction of the vehicle body with respect to the discharge opening from a bottom of the second storage tank is provided. Consequently, the retaining part including the wall part extending upward with respect to the discharge opening surrounds the central side as viewed in the front-rear direction of the work vehicle and the right and left sides of the discharge opening, so that even in a case where the stored fluid is biased to the central side as viewed in the front-rear direction of the work vehicle in the tank, for example, even when the work vehicle climbs a road surface inclined at the predetermined angle, the stored fluid is stored in the retaining part, and therefore the stored fluid can be discharged from the second storage tank through the discharge member.

In a work vehicle according to a third aspect of the present invention, the hollow tube member extends through the wall part of the stored fluid retaining part, and the hollow tube opening is located on the side close to the center in the front-rear direction of the vehicle body with respect to the stored fluid retaining part. Consequently, the second end of the hollow tube member extends through the retaining part, and the hollow tube opening is provided on the side close to the center in the front-rear direction of the work vehicle, so that the second end of the hollow tube member extends toward the center in the front-rear direction of the work vehicle while the retaining part is disposed in the second storage tank, and the hollow tube opening can be provided on the side close to the center in the front-rear direction of the work vehicle.

In a work vehicle according to a fourth aspect of the present invention, a replenishing port for supplying the stored fluid to the first storage tank is provided, the hollow tube member is composed of a plurality of the hollow tube members, and the hollow tube member disposed closest to the replenishing port, out of the plurality of hollow tube members, has the largest inner diameter. Consequently, the hollow tube member disposed closest to the replenishing port has the largest inner diameter compared to other hollow tube member, so that when the stored fluid is replenished to the tank from the replenishing port, the stored fluid can be satisfactorily replenished to the second storage tank.

In a work vehicle according to a fifth aspect of the present invention, a return part that returns, to the second storage tank, a part or all of the stored fluid discharged from the discharge member is provided. Consequently, the return part is provided in the second storage tank, so that even in a case where the stored fluid is biased to the opposite side to the central side of the tank, for example, even when the work vehicle climbs a road surface inclined at the predetermined angle, the stored fluid returned to the second storage tank from the return part can be stored on the lower side in the gravity direction with respect to the hollow tube opening of the hollow tube member.

In a work vehicle according to a sixth aspect of the present invention, the vehicle body is mounted with an internal combustion engine that generates driving force, and the stored fluid is fuel for the internal combustion engine. Consequently, the tank is a fuel tank for storing fuel as stored fluid, so that even in a case where the fuel is biased to the opposite side to the central side as viewed in the front-rear direction of the work vehicle in the fuel tank, for example, even when the work vehicle climbs a road surface inclined at the predetermined angle, the fuel is supplied to the internal combustion engine, so that the work vehicle can climb.

In a work vehicle according to a seventh aspect of the present invention, division is performed by the first storage tank and the second storage tank, and a piping member having a first end connected to the hollow tube member so as to enable the stored fluid to flow, and a second end connected to the first storage tank so as to enable the stored fluid to flow is provided. Consequently, the tank is divided into the first storage tank and the second storage tank, and the stored fluid can flow through the first storage tank and the second storage tank through the piping member, so that for example, the internal combustion engine disposed above the tank can be maintained from the tank side while the stored fluid can flow between the first storage tank and the second storage tank.

EXPLANATION OF REFERENCE SIGNS 1 vehicle body
9 fuel (stored fluid)
10 engine (internal combustion engine)
31, 131 fuel tank (tank)
32 first storage tank
34 second storage tank
34d bottom
36 partition plate (partition part)
38 oil filling port (replenishing port)
44 fourth tube (return part)
49 sucking-out member (discharge member)
49a opening (discharge opening)
52 fuel retaining member (stored fluid retaining part)
52a front wall (wall part)
52b side wall (wall part)
60 first tubular member (hollow tube member)
62 opening (hollow tube opening)
64 second tubular member (hollow tube member)
66 opening (hollow tube opening)
133 piping part (piping member)

The invention claimed is:
1. A work vehicle comprising a tank formed so as to extend from a front part or a rear part of a vehicle body toward a center in a front-rear direction of the vehicle body, wherein
the tank includes:
a first storage tank located on a front side or a rear side of the vehicle body, and stores stored fluid;
a second storage tank located on a side close to the center in the front-rear direction of the vehicle body, and stores the stored fluid;
a partition part that separates the first storage tank and the second storage tank;
a discharge member that has a discharge opening extending and opened inside the second storage tank, and discharges, from the second storage tank, the stored fluid stored in the second storage tank; and
a hollow tube member that has a first end communicated with the first storage tank through the partition part so as to enable the stored fluid to flow, and a second end having a hollow tube opening extending and opened toward the center in the front-rear direction of the vehicle body inside the second storage tank, and
a stored fluid retaining part that is provided in the second storage tank so as to surround the discharge opening by a wall part from the center in the front-rear direction of the vehicle body, and right and left sides, and that has the wall part extending upward in a vertical direction of the vehicle body with respect to the discharge opening from a bottom of the second storage tank is provided, wherein
the hollow tube opening of the hollow tube member is located on the side close to the center in the front-rear direction of the vehicle body with respect to the discharge opening of the discharge member.
2. The work vehicle according to claim 1, wherein
the hollow tube member extends through the wall part of the stored fluid retaining part, and
the hollow tube opening is located on the side close to the center in the front-rear direction of the vehicle body with respect to the stored fluid retaining part.
3. The work vehicle according to claim 1, wherein
a return part that returns, to the second storage tank, a part or all of the stored fluid discharged from the discharge member is provided.
4. The work vehicle according to claim 1, wherein
the vehicle body is mounted with an internal combustion engine that generates driving force, and
the stored fluid is fuel for the internal combustion engine.
5. The work vehicle according to claim 1, wherein
the tank is divided to the first storage tank and the second storage tank, and
a piping member having a first end connected to the hollow tube member so as to enable the stored fluid to flow, and a second end connected to the first storage tank so as to enable the stored fluid to flow is provided.

6. A work vehicle comprising a tank formed so as to extend from a front part or a rear part of a vehicle body toward a center in a front-rear direction of the vehicle body, wherein the tank includes:
- a first storage tank located on a front side or a rear side of the vehicle body, and stores stored fluid;
- a second storage tank located on a side close to the center in the front-rear direction of the vehicle body, and stores the stored fluid;
- a partition part that separates the first storage tank and the second storage tank;
- a discharge member that has a discharge opening extending and opened inside the second storage tank, and discharges, from the second storage tank, the stored fluid stored in the second storage tank;
- a hollow tube member that has a first end communicated with the first storage tank through the partition part so as to enable the stored fluid to flow, and a second end having a hollow tube opening extending and opened toward the center in the front-rear direction of the vehicle body inside the second storage tank; and
- a replenishing port for supplying the stored fluid to the first storage tank, wherein the hollow tube member is composed of a plurality of the hollow tube members, the hollow tube member disposed closest to the replenishing port, out of the plurality of hollow tube members, has the largest inner diameter, and the hollow tube opening of the hollow tube member is located on the side close to the center in the front-rear direction of the vehicle body with respect to the discharge opening of the discharge member.

7. The work vehicle according to claim 6, wherein
a return part that returns, to the second storage tank, a part or all of the stored fluid discharged from the discharge member is provided.

8. The work vehicle according to claim 6, wherein
the vehicle body is mounted with an internal combustion engine that generates driving force, and
the stored fluid is fuel for the internal combustion engine.

9. The work vehicle according to claim 6, wherein
the tank is divided to the first storage tank and the second storage tank, and
a piping member having a first end connected to the hollow tube member so as to enable the stored fluid to flow, and a second end connected to the first storage tank so as to enable the stored fluid to flow is provided.

* * * * *